May 20, 1930.                F. HILLEBRAND                1,759,787
                PROTECTIVE DEVICE FOR ROTARY CONVERTERS
                        Filed June 17, 1927
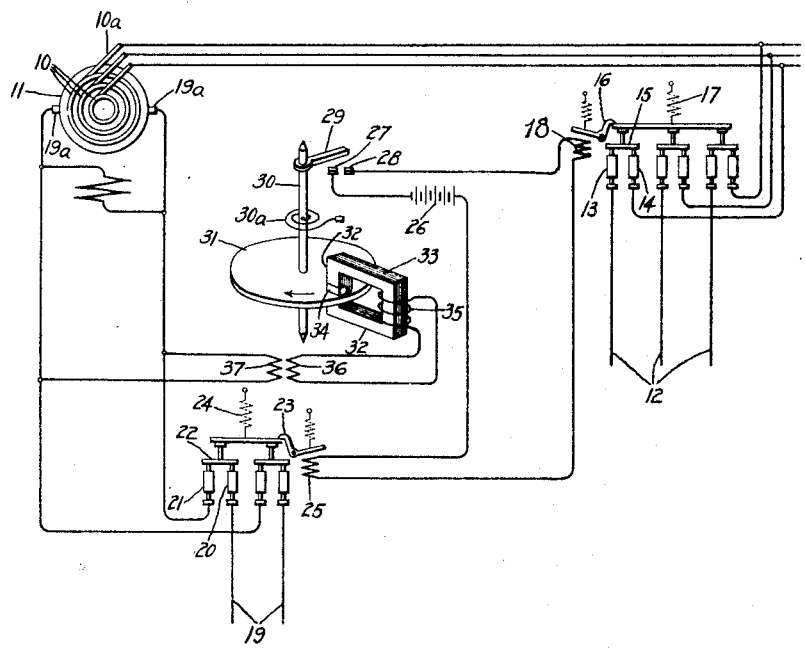
                                    Inventor:
                                Franz Hillebrand,
                            by    [signature]
                                    His Attorney.

Patented May 20, 1930

1,759,787

UNITED STATES PATENT OFFICE

FRANZ HILLEBRAND, OF NIEDERSCHONHAUSEN, BERLIN, GERMANY, ASSIGNOR TO GENERAL ELECTRIC COMPANY, A CORPORATION OF NEW YORK

PROTECTIVE DEVICE FOR ROTARY CONVERTERS

Application filed June 17, 1927, Serial No. 199,607, and in Germany June 30, 1926.

My invention relates to a polyphase rotary converter protective arrangement.

During the operation of a polyphase rotary converter if an unbalance occurs in the phases of the alternating current circuit because of dissymmetry of the voltages across the phases due to any well known cause it is well-known that a single phase pulsating armature reaction of inverse rotating field is produced which causes marked pulsations in the direct current circuit resulting in excessive sparking at the brushes and which is likely to cause a flash over. In case the unbalance of the phases of the alternating current circuit is very pronounced the rotary converter may also fall out of synchronism resulting in a damaging surge in current thereto from the alternating current circuit.

The object of my invention is to provide a protective arrangement in operative relation to the direct current end of a rotary converter which will respond to pulsations caused therein by an unbalance of the phases of the alternating current circuit, but which will not be affected by the flow of current in the direct current circuit of the machine during its ordinary operation.

My invention will be more fully set forth in the following description referring to the accompanying drawings, in which the single figure diagrammatically illustrates a rotary converter with my invention applied thereto.

In the drawing the usual form of polyphase rotary converter diagrammatically illustrated is provided with slip rings 10 and a commutator 11 which are connected to external circuits through circuit breakers of any suitable form. In the present embodiment of my invention the slip rings 10 are connected to polyphase alternating current mains 12 through brushes 10ª and a circuit breaker comprising adjacent fixed contacts 13 and 14 connected to the alternating current mains 12 and the slip rings of the rotary converter respectively. The fixed contacts 13 and 14 are bridged by movable contacts 15 for completing the circuit between the alternating current mains and the slip rings. The movable contacts are retained in engagement with the fixed contacts 13 and 14 by a latch 16 against the action of a spring 17. A trip coil 18 is arranged adjacent the latch 16 so that upon energization of the trip coil 18 the latch 16 will release the movable contacts 15 permitting them to be moved away from the fixed contacts 13 and 14 by the spring 17 thereby disconnecting the rotary converter from the alternating current mains. The commutator 11 is connected to direct current mains 19 through brushes 19ª and a circuit breaker which is provided with fixed contacts 20 and 21 connected to the direct current mains 19 and the commutator brushes 19ª respectively. The fixed contacts 20 and 21 are bridged by movable contacts 22 for completing the circuit between the rotary converter and the direct current mains 19, and the movable contacts 22 are retained in engagement with the fixed contacts 20 and 21 by a latch 23 against the action of the spring 24. A trip coil 25 is adapted when energized to release the latch 23 which permits the spring 24 to move the contacts 22 away from the fixed contacts 20 and 21 thereby opening the circuit between the rotary converter and the direct current mains 19.

After the rotary converter is synchronized and connected to the polyphase alternating current mains and to the direct current mains, if an unbalance of the phases of the alternating current circuit occurs a single phase pulsating armature reaction is produced which causes marked pulsating in the direct current circuit, as will be readily understood by those skilled in the art. In accordance with my invention any suitable means for energizing the trip coil 25 of the circuit breaker in the direct current circuit, or the trip coil 18 of the circuit breaker in the alternating current circuit or both is arranged to energize the trip coils in response to pulsations in the direct current circuit caused therein by an unbalance of the phases of the alternating current circuit, but which is not affected by the direct current flow therein when the phases of the alternating current circuit are balanced. In the embodiment of my invention illustrated in the drawing this energizing means for the circuit breaker trip coils comprises a source of potential 26 which is connected in a circuit including the trip coils 18 and 25 terminating at the spaced contacts 27 and 28. These spaced contacts are arranged in the path of movement of an arm 29 which is fixed on a shaft 30 of a voltage relay of the induction type. A spring 30ᵃ is arranged around the shaft 30 and retains the arm 29 in a position at one side of the spaced contacts 27 and 28, as shown in the drawing, when torque is not being applied to the shaft 30. The shaft 30 is also provided with a disk 31 fixed thereon which rotates between the arms 32 of a stationary magnet 33. The arms 32 of the magnet are provided with the usual shading coils 34 so that when an alternating flux is produced in the magnet the disk 31 will rotate as indicated by the arrow thereon bringing the arm 29 into engagement with the spaced contacts 27 and 28 thereby energizing the trip coils 18 and 25 and opening the alternating and direct current circuits to the rotary converter. In this instance the alternating flux is produced in the magnet 33 by a winding 35 which is connected across the terminals of the secondary 36 of a transformer. The primary 37 of this transformer is connected across the brushes at the direct current end of the rotary converter and is of high enough resistance to limit the direct current flow therein to a negligible amount during the condition of balance in the phases of the rotary converter. It will be apparent, however, that when an unbalance occurs in the phases of the rotary converter that the resulting pulsating current in the winding 37 will produce an alternating current in the secondary winding 36 and correspondingly energize the winding 35, thereby producing an alternating flux for actuating the induction relay. In ordinary operation of the rotary converter it will be connected to the alternating current mains and to the direct current mains by closing the respective circuit breakers, and power will be transformed from the alternating current circuit to the direct current circuit in the usual manner. Current will flow from the brushes 19ᵃ to the primary 37 of the transformer but will have no effect on the secondary 36 thereof, as the flux produced by the primary 37 will be unidirectional. If under this condition the phases in the alternating current circuit become unbalanced the resulting single phase pulsating armature reaction will cause marked pulsations in the direct current circuit. These pulsations will also occur in the primary 37 of the transformer and will induce an alternating current in the secondary 36 thereof. The winding 36 will then cause an alternating current to flow in the winding 35 which will produce an alternating flux in the magnet 33 and will rotate the disk 31, as indicated by the arrow thereon, against the action of the spring 30ᵃ. The movement of the disk 31 will bring the arm 29 into engagement with the spaced contacts 27 and 28 which will complete the circuit between the source of potential 26 and the trip coils 18 and 25. Energizing the trip coils in this way releases the latches 16 and 23 which will open the circuit breakers and disconnect the rotary converter from the direct and alternating current mains and prevent any injury to the machine which might otherwise be caused by the unbalance in the alternating current circuit.

It will be apparent that my improved protective arrangement will function whether the rotary converter is transforming energy from the alternating current circuit to the direct current circuit or conversely, and I desire it to be understood that my invention is not to be limited to the particular arrangement shown and described except in so far as limited in the appended claims.

What I claim as new and desire to secure by Letters Patent of the United States, is:—

1. In combination, a rotary converter, alternating current mains, direct current mains, means including brushes for completing a circuit between the direct current end of said converter and said direct current mains, means for completing a circuit between the alternating current end of said converter and said alternating current mains, and means connected across said direct current brushes and dependent upon pulsations in the direct current circuit for interrupting the circuit between said converter and said alternating current mains.

2. In combination, a rotary converter, alternating current mains, direct current mains, means including brushes for completing a circuit between the direct current end of said converter and said direct current mains, means for completing a circuit between the alternating current end of said converter and said alternating current mains, means connected across said direct current brushes and dependent upon pulsations in the direct current circuit for interrupting the circuit between said converter and said alternating current mains and for interrupting the circuit between said converter and said direct current mains.

3. In combination, a rotary converter, alternating current mains, direct current mains, means including brushes for completing a circuit between the direct current end of said converter and said direct current mains, means for completing a circuit between the alternating current end of said converter and said alternating current mains, and means connected across said direct current brushes and dependent upon pulsations in the direct current circuit for interrupting the circuit between said converter and said direct current mains.

4. In combination, a rotary converter, polyphase alternating current mains, direct current mains, means including brushes for connecting the direct current end of said converter to said direct current mains, means for connecting the alternating current end of said converter to said polyphase alternating current mains, and means connected across the brushes at the direct current end of said converter for interrupting the connection between said converter and said alternating current mains in response to an unbalance in the phases of the alternating current circuit.

5. In combination, a rotary converter, alternating current mains, direct current mains, means including brushes for completing a circuit between the direct current end of said converter and said direct current mains, means for completing the circuit between the alternating current end of said converter and said alternating current mains, and means including a voltage relay connected across the brushes at the direct current end of said converter dependent upon pulsations in the direct current circuit for interrupting the circuit between said converter and said alternating current mains.

6. In combination, a rotary converter, alternating current mains, direct current mains, means including brushes for completing the circuit between the direct current end of said converter and said direct current mains, means for completing a circuit between the alternating current end of said converter and said alternating current mains, and means including a voltage relay connected across the brushes at the direct current end of said converter dependent upon pulsations in the direct current circuit for interrupting the circuit between said converter and said direct current mains.

7. In combination, a rotary converter, polyphase alternating current mains, direct current mains, means including brushes for connecting the direct current end of said converter to said direct current mains, means for connecting the alternating current end of said converter to said polyphase alternating current mains, and means including a voltage relay connected across the brushes at the direct current end of said converter for interrupting the connection between said converter and said alternating current mains in response to an unbalance in the phases of the alternating current circuit.

In witness whereof, I have hereunto set my hand this 24th day of May, 1927.

FRANZ HILLEBRAND.